United States Patent
Ishida et al.

(10) Patent No.: US 10,754,019 B2
(45) Date of Patent: Aug. 25, 2020

(54) PULSE RADAR DEVICE

(71) Applicants: FURUKAWA ELECTRIC CO., LTD., Tokyo (JP); FURUKAWA AUTOMOTIVE SYSTEMS INC., Shiga (JP)

(72) Inventors: Yoshiyuki Ishida, Tokyo (JP); Yasushi Aoyagi, Tokyo (JP); Hiroyasu Yano, Tokyo (JP)

(73) Assignees: FURUKAWA ELECTRIC CO., LTD., Tokyo (JP); FURUKAWA AUTOMOTIVE SYSTEMS INC., Shiga (JP)

( * ) Notice: Subject to any disclaimer, the term of this patent is extended or adjusted under 35 U.S.C. 154(b) by 163 days.

(21) Appl. No.: 15/720,936

(22) Filed: Sep. 29, 2017

(65) Prior Publication Data

US 2018/0024234 A1 Jan. 25, 2018

Related U.S. Application Data

(63) Continuation of application No. PCT/JP2016/060141, filed on Mar. 29, 2016.

(30) Foreign Application Priority Data

Mar. 31, 2015 (JP) .................. 2015-074099

(51) Int. Cl.
*G01S 13/44* (2006.01)
*G01S 7/02* (2006.01)
*G01S 13/42* (2006.01)

(52) U.S. Cl.
CPC ............... *G01S 13/44* (2013.01); *G01S 7/02* (2013.01); *G01S 13/42* (2013.01)

(58) Field of Classification Search
CPC .... G01S 13/18; G01S 13/4454; G01S 13/931; G01S 2007/2886; G01S 7/285; G01S 7/292; G01S 7/4021
(Continued)

(56) References Cited

U.S. PATENT DOCUMENTS

| 5,677,695 A | 10/1997 | Suzuki et al. |
| 5,955,991 A | 9/1999 | Kawakubo |

(Continued)

FOREIGN PATENT DOCUMENTS

| CN | 103430041 A | 12/2013 |
| JP | 11-160423 A | 6/1999 |

(Continued)

OTHER PUBLICATIONS

English translation of Written Opinion (PCT/ISA/237) issued in PCT/JP2016/060141 dated Jun. 2016.
(Continued)

*Primary Examiner* — Timothy X Pham
(74) *Attorney, Agent, or Firm* — Chen Yoshimura LLP (57) ABSTRACT

The objective of the present invention is to use a simple circuit configuration and simple signal processing to provide a pulse radar device with which it is possible to reduce the impact of local signal carrier leakage on a received signal, and which makes it possible to perform high precision angle measurement using a multi-beam system. In order to measure the angle of an object, a pulse radar device is provided with at least two receiving antennas, and a reception circuit is provided with a signal selection switch for selectively switching between received signals received by the receiving antennas. The received signal contains a local signal leakage component, and a DC level of the received signal varies with the switching of the signal selection switch. In order to eliminate the impact of such DC level variations, a
(Continued)

high-pass filter is disposed between a mixer and a frequency analyzer.

20 Claims, 8 Drawing Sheets

(58) Field of Classification Search
USPC .......................................................... 342/152
See application file for complete search history.

(56) References Cited

U.S. PATENT DOCUMENTS

| | | | |
|---|---|---|---|
| 2006/0055593 A1* | 3/2006 | Honda | G01S 7/4021 342/174 |
| 2009/0207068 A1* | 8/2009 | Inaba | G01S 7/354 342/70 |
| 2010/0207806 A1 | 8/2010 | Takahashi et al. | |
| 2011/0128071 A1* | 6/2011 | Fukusen | H03H 11/1291 327/554 |
| 2013/0016000 A1* | 1/2013 | Matushima | G01S 7/03 342/107 |
| 2014/0022114 A1* | 1/2014 | Kamimura | G01S 7/285 342/134 |
| 2018/0175905 A1* | 6/2018 | Nabki | H04L 7/00 |

FOREIGN PATENT DOCUMENTS

| | | |
|---|---|---|
| JP | 3251154 B2 | 1/2002 |
| JP | 2002-162460 A | 6/2002 |
| JP | 2006-105968 A | 4/2006 |
| JP | 2006-203718 A | 8/2006 |
| JP | 2008-241350 A | 10/2008 |
| JP | 2009-031165 A | 2/2009 |
| JP | 2009-258133 A | 11/2009 |
| JP | 2010-216980 A | 9/2010 |
| JP | 2011-61824 A | 3/2011 |
| JP | 2011-215114 A | 10/2011 |
| WO | 2011/122269 A1 | 10/2011 |

OTHER PUBLICATIONS

European Search Report dated Oct. 23, 2018, in a counterpart European patent application No. 16772839.3.
International Search Report (ISR) issued in PCT/JP2016/060141 dated Jun. 2016.
Written Opinion (PCT/ISA/237) issued in PCT/JP2016/060141 dated Jun. 2016.
Japanese Office Action dated Feb. 14, 2020, in a counterpart Japanese patent application No. 2017-510029. (A machine translation (not reviewed for accuracy) attached.).
Chinese Office Action dated Aug. 5, 2019, in a counterpart Chinese patent application No. 201680007413.X. (A machine translation (not reviewed for accuracy) attached.).
European Office Action dated Feb. 3, 2020, in a counterpart European patent application No. 16772839.3.
Chinese Office Action dated May 26, 2020, in a counterpart Chinese patent application No. 201680007413.X. (A machine translation (not reviewed for accuracy) attached.).

* cited by examiner

PULSE RADAR DEVICE

BACKGROUND OF THE INVENTION

Technical Field

The present invention relates to a pulse radar device and particularly to a multi-beam pulse radar device capable of measuring the angle of an object from signals received by a plurality of receiving antennas.

Background Art

It is known that radar devices function by emitting a pulse signal as a radio wave and then receiving the reflected wave that has reflected off of an object so as to detect the object and acquire object information such as the location of the object, relative speed, or the like. There are also conventional monopulse radar devices that can additionally detect the angle of an object as such object information. In a pulse radar device capable of measuring the angle of an object, a reception circuit is provided with a selection switch for switching between and inputting received signals from a plurality of receiving antennas in order to make the circuit configuration small and low-cost. This type of pulse radar device is installed in a vehicle to support safe driving or the like, for example.

In a monopulse radar device, phase or amplitude differences are directly acquired from the respective signals received by the plurality of receiving antennas, and the differences are input to a digital signal processor to detect the angle of the object. In a multi-beam scheme, processes such as beam selection or combination are performed by a digital signal processor in accordance with the detection goals in order to make it possible to detect the required information, and in a multi-beam pulse radar device, it is not only possible to detect location information or angle of the object, but also possible via digital processing to use the multi-beam to control directivity, remove interference waves, track the object, or the like, for example.

One known method to generate a pulse signal from a radio wave is to input a continuous wave (CW) from a continuous wave signal generating circuit, which outputs continuous wave signals (local signals) of a prescribed high frequency, and then use a high-speed RF switch to pass the continuous wave for only a prescribed amount of time so as to modulate the continuous wave signal into a pulse signal. In pulse radar devices using this type of pulse signal generating method, there are known to be problems such as the continuous wave signal leaking and causing unwanted carrier leakage, which influences the measurement of object information.

A known conventional technique to reduce the effects of carrier leakage of continuous wave signals is disclosed in Patent Document 1, for example. In Patent Document 1, a first local signal and a second local signal of an opposite phase to the first local signal are respectively modulated and combined to generate a pulse signal and to have the respective leakage components in the first local signal and second local signal cancel each other out.

RELATED ART DOCUMENT

Patent Document

Patent Document 1: Japanese Patent Application Laid-Open Publication No. 2011-61824

SUMMARY OF THE INVENTION

However, in the conventional technique disclosed in Patent Document 1, in order to respectively modulate and combine the first local signal and second local signal, it is necessary to provide a transmission unit with two each of a local signal oscillator and a mixer and to additionally provide a combiner. This causes problems such as increasing the size of the circuits in the transmission unit and raising costs.

Furthermore, when the selection switch switches between the received signals from the plurality of receiving antennas, problems occur such as the unwanted leakage components of the continuous wave signals varying at the switching frequency of the receiving antennas.

The present invention was made in view of the aforementioned problems and aims at providing a pulse radar device in which a simple circuit configuration and signal processing reduces the influence of carrier leakage of local signals on received signals and makes it possible to perform high-precision angle measurement via a multi-beam scheme.

To solve the aforementioned problems, a first aspect of a pulse radar device of the present invention is a continuous wave generation circuit generating a continuous wave of a prescribed high frequency; a transmission circuit receiving the continuous wave generated by the continuous wave generation circuit and modulating the continuous wave into a pulse signal; a transmitting antenna repeatedly emitting the pulse signal from the transmission circuit into space at a prescribed emission period; two or more receiving antennas receiving reflected signals from the pulse signal emitted from the transmitting antenna reflecting off of an object to be measured; two or more amplifiers respectively amplifying the received reflected signals that have been received by the two or more receiving antennas so as to output respective amplified signals; a signal selection switch receiving the respective amplified signals and switching between the respective amplified signals at a prescribed switching period so as to sequentially select and output the amplified signals originating from one of the receiving antennas at the prescribed switching period; a mixer receiving the selected amplified signals sequentially outputted from the signal selection switch, the mixer down-converting the selected amplified signals by using the continuous wave input from the continuous wave generation circuit so as to output a baseband signal; a frequency analyzer analyzing the baseband signal from the mixer and outputting information about the object detected from the baseband signal; and a high pass filter provided after the signal selection switch and before the frequency analyzer, the high pass filter causing DC and other low frequency components that are lower than a prescribed frequency in the baseband signal to be removed before reaching the frequency analyzer.

In another aspect of a pulse radar device of the present invention, a cutoff frequency of the high pass filter is higher than a frequency set by the prescribed switching period at which the signal selection switch sequentially selects and outputs the one of the respective amplified signals.

In another aspect of a pulse radar device of the present invention, the prescribed emission period of the pulse signal repeatedly outputted from the transmitting antenna is divided into Tmeas and Twait, where Tmeas is a measuring period at least as long as a time it would take for the pulse signal to reach and be reflected off of the object if the object were located at a prescribed maximum measureable distance, and Twait is a remaining period of the emission period, and the signal selection switch switches between the respective amplified signals at a point in time within Twait.

In another aspect of a pulse radar device of the present invention, the pulse radar device further includes a distributor distributing the one of the respective amplified signals sequentially outputted from the signal selection switch into two signals, and the mixer is an IQ mixer receiving the two signals that have been distributed by the distributor and down-converting the two received signals into an I component baseband signal and a Q component baseband signal, respectively.

In another aspect of a pulse radar device of the present invention, the high pass filter has a capacitor.

The present invention makes it possible to provide a pulse radar device in which a simple circuit configuration and signal processing reduces the influence of carrier leakage of local signals on received signals and makes it possible to perform high-precision angle measurement via a multi-beam scheme.

DETAILED DESCRIPTION OF EMBODIMENTS

A pulse radar device in one preferred embodiment of the present invention will be described in detail below with reference to the drawings. In order to simplify the drawings and descriptions, parts having the same function are given the same reference character.

Embodiment 1

A pulse radar device of Embodiment 1 of the present invention will be described below using FIG. 1.

Figure 1:
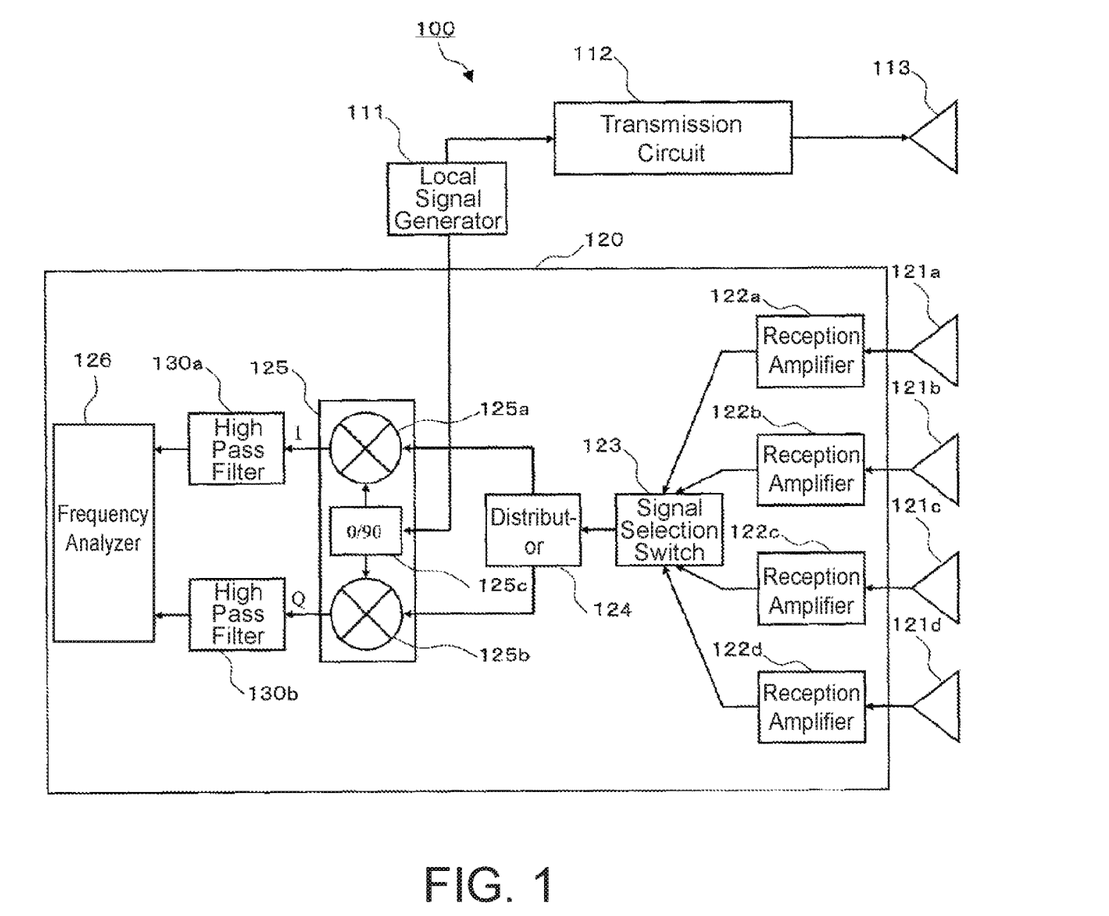
FIG. 1 is a block diagram showing a configuration of a pulse radar device in Embodiment 1 of the present invention.

FIG. 1 shows a block diagram of a configuration of a pulse radar device 100 of the present embodiment. The pulse radar device 100 includes a local signal generator (continuous wave generation circuit) 111 that outputs high frequency local signals, which are continuous waves. A transmission circuit 112 and transmitting antenna 113 are also provided on the transmission side.

On the reception side, there are four receiving antennas 121*a*, 121*b*, 121*c*, and 121*d* for receiving reflected waves that have reflected off of an object, and each received signal is input to a reception circuit 120. The reception circuit 120 includes: four reception amplifiers 122*a*, 122*b*, 122*c*, and 122*d* for respectively amplifying the received signals received by the four receiving antennas 121*a*, 121*b*, 121*c*, and 121*d*; a signal selection switch 123 for selectively switching between received signals; a distributor 124 for distributing the received signal selected by the signal selection switch 123 into two; an IQ mixer 125 that down-converts the two received signals output from the distributor 124 with a local signal input from the local signal generator 111 so as to output I component and Q component baseband signals; and a frequency analyzer 126 to which the I component and Q component baseband signals are input from the IQ mixer 125 so as to detect object information via digital processing.

Instead of providing the distributor 124, the received signals may be input from the signal selection switch to the mixer and down-converted into baseband signals by continuous waves received from the continuous wave generation circuit.

The IQ mixer 125 has a first mixer 125*a*, a second mixer 125*b*, and a phase shifter 125*c*. The phase shifter 125*c* outputs two signals: a signal in which the phase of the local signal input from the local signal generator 111 is output as-is without being shifted; and a signal in which the phase is shifted only 90°. The signal with the unshifted phase is input to the first mixer 125*a*, and the signal with the phase that has been shifted 90° is output to the second mixer 125*b*. Thus, the I component baseband signal is output from the first mixer 125*a*, and the Q component baseband signal is output from the second mixer 125*b*.

The frequency analyzer 126 uses the I component and Q component of the baseband signals input from the IQ mixer 125 to detect information regarding the location, relative speed, and angle of the object. By using the I component and Q component of the baseband signals, which were the signals that were received by the four receiving antennas, it is possible to detect object information with high precision. In the present embodiment, the IQ mixer 125 is used to down-covert the received signals, but the present invention is not limited to this, and it is possible to use a mixer that outputs only the baseband signal corresponding to the I component, for example.

The pulse radar device 100 of the present embodiment is configured to include two or more receiving antennas in order to measure the angle of the object with a multi-beam scheme; the number of receiving antennas 121 is four (121*a*, 121*b*, 121*c*, and 121*d*) as described here, but this is only one example of the present embodiment. There are also four reception amplifiers 122 (122*a*, 122*b*, 122*c*, and 122*d*) provided in correspondence with the four receiving antennas 121*a*, 121*b*, 121*c*, and 121*d* in order to amplify the respective received signals. Furthermore, in order to sequentially select and process the received signals received by the four receiving antennas 121*a*, 121*b*, 121*c*, and 121*d*, the signal selection switch 123 is provided for selectively switching between the received signals.

The pulse radar device 100 configured as described above operates as described below in order to detect object information. First, a local signal output from the local signal generator 111 is input to the transmission circuit 112 and modulated into a high frequency pulse signal here. The transmission circuit 112 can be configured to include a high-speed RF switch, for example, and the high-speed RF switch can be used to cause a continuous wave local signal to be modulated into a pulse signal.

The pulse signal output from the transmission circuit 112 is transmitted to the transmitting antenna 113 and then emitted into space as a radio wave from the transmitting antenna 113. If there is an object in the emission direction of the transmitting antenna 113, the radio wave will reflect off of the object, and a portion of the reflected wave will be received by the receiving antennas 121a, 121b, 121c, and 121d. The received signals that are received by the receiving antennas 121a, 121b, 121c, and 121d are respectively amplified by the reception amplifiers 122a, 122b, 122c, and 122d and then transmitted to the signal selection switch 123. Of the four received signals transmitted to the signal selection switch 123, one received signal is selected to pass through the signal selection switch 123.

The one received signal that is output from the signal selection switch 123 is input to the distributor 124 and then distributed into two received signals, which are then respectively input to the first mixer 125a and second mixer 125b of the IQ mixer 125. In the first mixer 125a and second mixer 125b, the respectively received signals input are down-converted into baseband signals, and an I component baseband signal and Q component baseband signal are respectively output therefrom.

The I component and Q component of the baseband signals output from the IQ mixer 125 are input to the frequency analyzer 126. In this manner, the signals received by the four receiving antennas 121a, 121b, 121c, and 121d are sequentially selected by the signal selection switch 123, and the respective I component and Q component baseband signals are input to the frequency analyzer 126 to thus perform detection processing for object information. In addition to information of the location or relative speed of the object, the angle of the object as seen from the pulse radar device 100 is also detected by the frequency analyzer 126.

The pulse radar device 100 of the present embodiment is configured to include four receiving antennas 121a, 121b, 121c, and 121d so as to measure the angle of an object with a multi-beam scheme, but in order to reduce the size and cost of the reception circuit 120, the signal selection switch 123 is used to sequentially switch and process the received signals that are received by the four receiving antennas 121a, 121b, 121c, and 121d. By using the signal selection switch 123, only one distributor 124 and IQ mixer 125 need to be provided, which makes it possible for the reception circuit 120 to be small and low-cost.

On the other hand, it is necessary to reduce the reception time differences among the receiving antennas as much as possible in order to perform angle detection of the object with high precision. To achieve this, it is preferable that the signal selection switch 123 sequentially switch between the receiving antennas 121a, 121b, 121c, and 121d each time a transmission pulse is emitted from the transmitting antenna 113; this would make it possible to reduce time differences in the received signals received by the respective antennas 121a, 121b, 121c, and 121d. However, the switching frequency and switching order of the signal selection switch 123 is not limited to this, and switching may occur each time a prescribed number of transmission pulses are emitted, for example.

Furthermore, in the transmission circuit 112, the continuous wave local signal is input from the local signal generator 111, and this local signal is modulated into a pulse signal by using a high-speed RF switch, for example, but carrier leakage will occur because a continuous wave is being used, and the carrier leakage will be received by the receiving antennas 121a, 121b, 121c, and 121d and then reach the reception circuit 120. The route that the carrier leakage takes to reach the reception circuit 120 differs for each receiving antenna. As a result, there is a different level of leakage component contained in each received signal that is received by the receiving antennas 121a, 121b, 121c, and 121b, and the direct current (DC) levels of the signals after being down-converted by the IQ mixer 125 differ for each receiving antenna 121a, 121b, 121c, and 121d.

Figure 2:
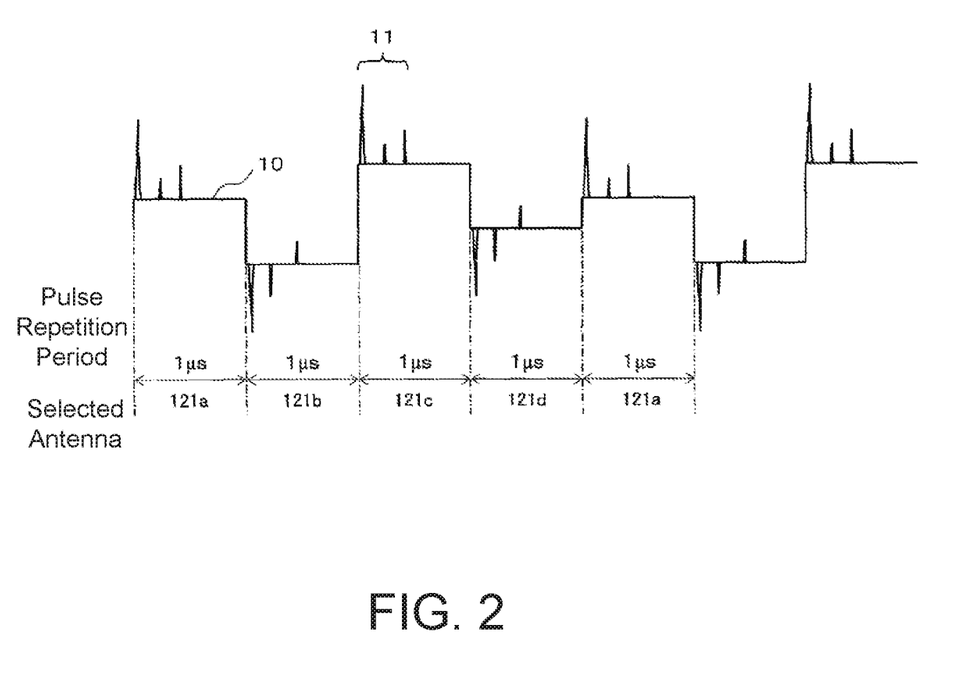
FIG. 2 is a time waveform diagram showing one example of received signals when the transmission pulse repetition period is 1 μs.

As described above, there are different levels of leakage component contained in the received signals received by the respective receiving antennas 121a, 121b, 121c, and 121d; thus, the DC levels of the received signals after being down-converted will vary at the switching frequency of the signal selection switch 123. As an example, FIG. 2 shows received signals when the transmission pulse repetition period is 1 µs (a repetition frequency of 1 MHz). FIG. 2 schematically shows one example of the received signals of the baseband after being down-converted by the IQ mixer 125. The signal selection switch 123 can switch every 1 µs; i.e., the same rate as the repetition period of the transmission pulse.

In FIG. 2, reference character 10 shows the DC level of the received signal, and reference character 11 shows the received signal that is acquired by receiving the reflected wave when the transmission pulse has reflected off of an object. The frequency analyzer 126 detects the received signal 11 to acquire object information. In contrast, the DC level 10 changes every time the signal selection switch 123 switches and is not necessary in the detection of object information. The DC level 10 changes with the same pattern at the period at which the receiving antennas 121a, 121b, 121c, and 121d are switched, i.e., every 4 µs, which is a frequency of 250 kHz. This type of variation in the DC level of the received signal caused by the leakage component affects detection of object information.

The pulse radar device 100 of the present invention counters this by using a high pass filter corresponding to the switching frequency of the signal selection switch 123 in order to eliminate the effects of variation in the DC level of the received signal caused by the leakage component. In the configuration of the pulse radar device 100 shown in FIG. 1, the high pass filter 130 (130a, 130b) is arranged between the IQ mixer 125 and the frequency analyzer 126. The high pass filter 130 is arranged downstream of the IQ mixer 125 in order to process low-frequency baseband signals.

Figure 3:
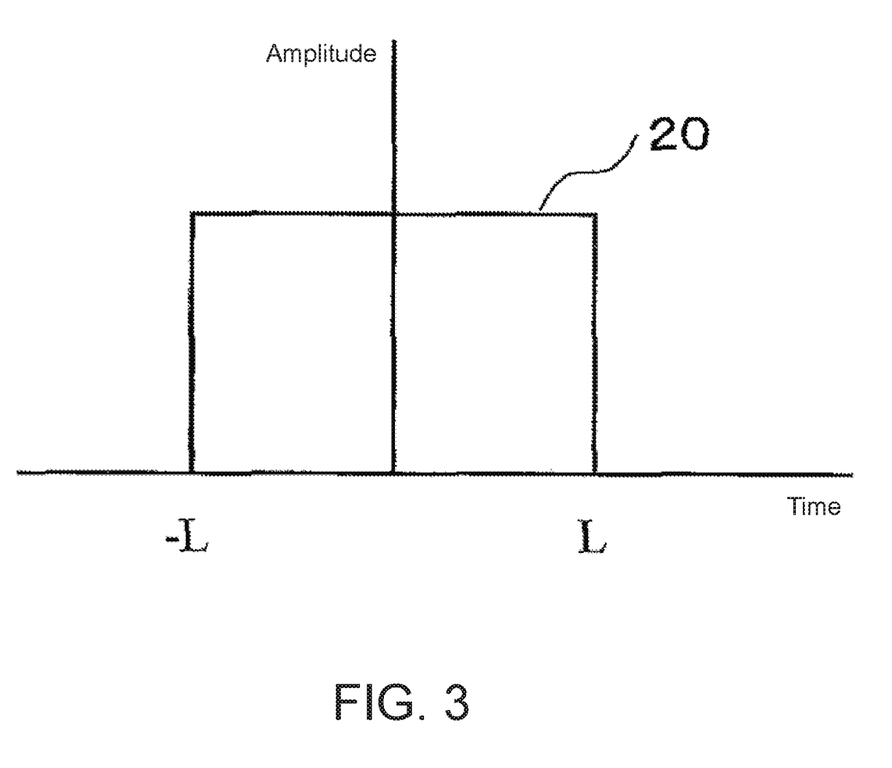
FIG. 3 is a time waveform diagram showing one example of a perfect square pulse.
Figure 4:
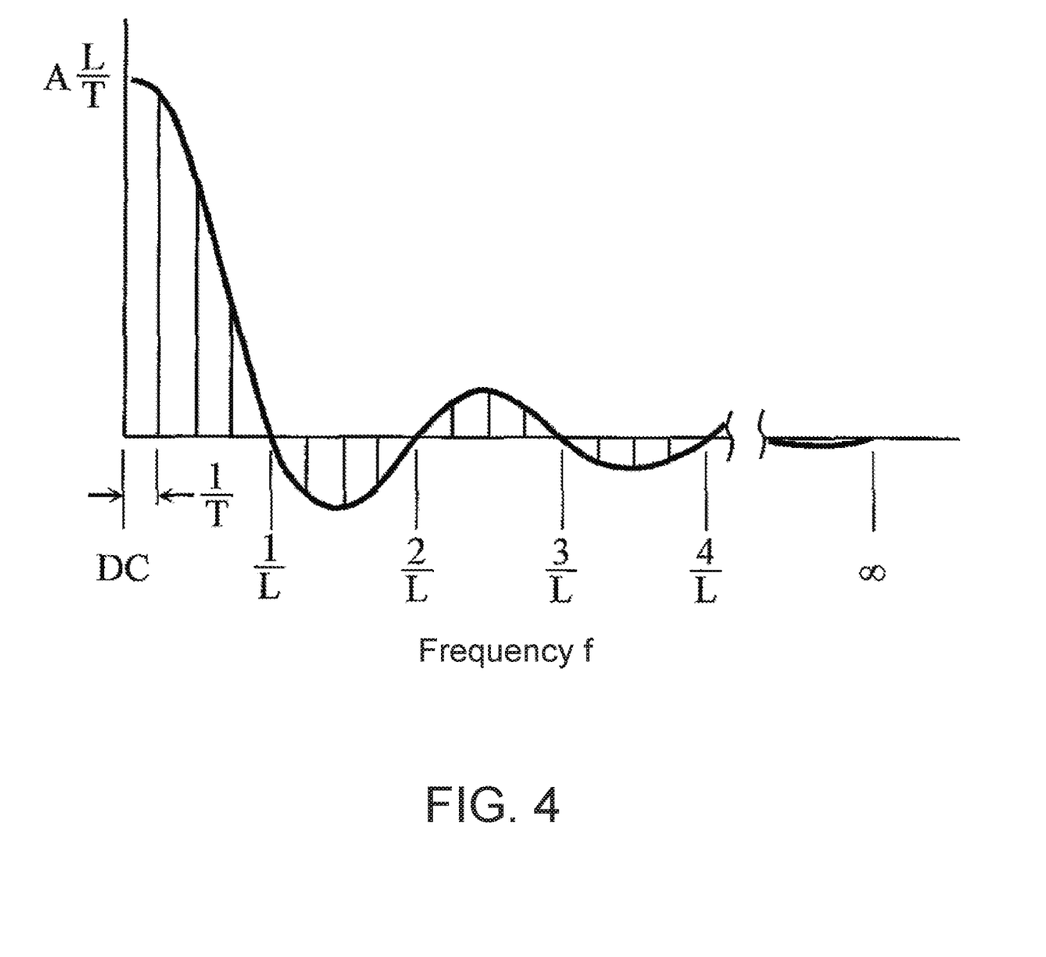
FIG. 4 is a spectrum diagram of the perfect square pulse.

The spectrum of a radio wave will be described while assuming that the pulse signal emitted from the transmission circuit 112 is a perfect square pulse (square wave). FIG. 3 shows one example of a time waveform of a perfect square pulse. FIG. 3 shows a time waveform of a perfect square pulse 20 where the horizontal axis is time and the vertical axis is amplitude. The pulse width of the perfect square pulse is 2L. At such time, the spectrum of the perfect square pulse is as shown in FIG. 4. In FIG. 4, the horizontal axis is frequency, and the vertical axis is amplitude. The spectrum shown in FIG. 4 is formed by an envelope of spectral lines that occur for every sampling period T. The spectrum of the perfect square pulse is formed by adding high frequency components to the infinite order.

The spectral lines of the spectrum shown in FIG. 4 appear every 1/T frequency interval, which is the reciprocal of the sampling period T. As shown in FIG. 4, with a perfect square pulse the amplitude of the DC component is greatest at a frequency of 0. Hereafter, the amplitude of the spectral lines will oscillate and decrease the higher the frequency becomes.

Figure 5:
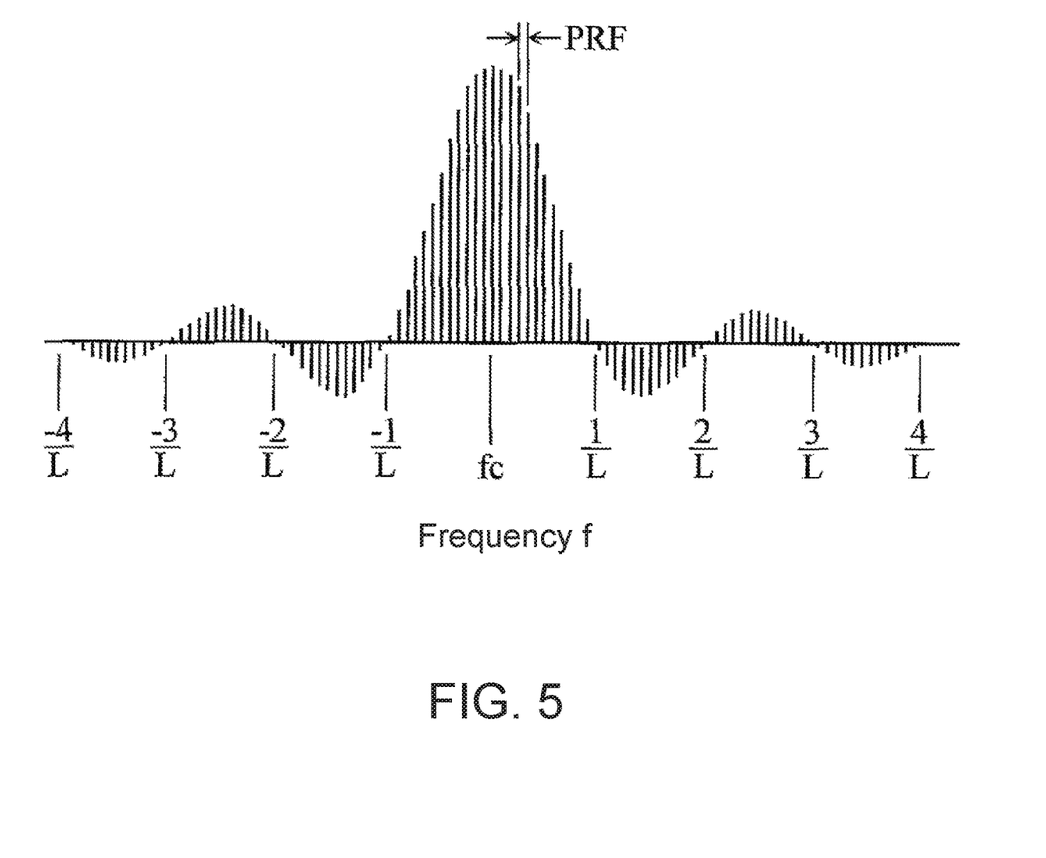
FIG. 5 is a spectrum diagram when a local signal is modulated with the perfect square pulse.

Next, FIG. 5 shows a spectrum in which a local signal, which is the carrier wave, has been modulated with the perfect square pulse shown in FIGS. 3 and 4. The center frequency fc corresponds to the frequency of the local signal. Assuming that PRF is the pulse repetition frequency at which the pulse signals are emitted from the transmitting antenna 113, the spectral lines of the spectrum appear every PRF. In other words, the emission period of the pulse signal is sampling period T.

The local signal that has been modulated with the perfect square pulse can be seen to have a widened spectrum centered on the center frequency fc. Furthermore, the pulse width of the pulse signal is sufficiently shorter than the pulse repetition period (1/PRF), and thus a large number of spectral lines can be obtained at the frequency width corresponding to the reciprocal of the pulse width. The pulse radar device 100 processes the spectral line appearing every such pulse repetition frequency PRF, thus being able to acquire object information. The signal components of the received signals, which are received reflected waves, have a frequency in the range of several dozen to several hundred MHz from the center frequency fc corresponding to the spectral lines shown in FIG. 5.

In contrast, the variation in the DC level of the received signal due to the leakage component in the local signal causes the spectrum to appear at a frequency location that corresponds to the switching frequency of the signal selection switch 123. As shown in FIG. 2, the spectrum that appears due to the variation in the DC level is formed at a frequency location of 250 kHz when the repetition period of the transmission pulse is 1 µs (repetition frequency of 1 MHz). As a countermeasure, the cutoff frequency of the high pass filter 130 should be set so as to eliminate the effects of such DC level variation. AC coupling by a capacitor can be used for the high pass filter 130, for example. If the relaxation oscillation at the high pass filter 130 is intense and cannot completely suppress unwanted waves, the effects of such relaxation oscillation can be avoided by sampling at a timing when the relaxation oscillation is calm.

The cutoff frequency fcut of the high pass filter 130 is preferably higher than the frequency at which the two or more receiving antennas are switched. It is even more preferable that the cutoff frequency be set so as to satisfy the parameters below:

$$fcut < N \times PRF + fd \qquad (1),$$

where fd is the largest Doppler frequency detected, PRF is pulse repetition frequency, and N=1, 2, 3, etc.

The Doppler frequency fd can be calculated with the following formula:

$$fd = -2fc \times V/c \qquad (2),$$

where fc is the frequency of the carrier wave (local signal), V is the relative speed (m/s) of the object, and c is the speed of light (m/s).

If the pulse radar device 100 is used as a vehicle radar, the relative speed V of the object would be, at most, approximately 84 m/s (approx. 300 km/h); therefore, the Doppler frequency of the leakage component after down-conversion would be 15 kHz or less when using a carrier wave in the 24 GHz band, for example, and 45 kHZ or less when using a carrier wave in the 79 GHz band.

Formula (1) requires that a frequency component of N×PRF+fd or higher not be removed by the high pass filter 130 (i.e., that such a frequency component be allowed to pass through the high pass filter 130). In other words, the frequency component of N×PRF+fd or higher in the received signal is used in the detection of object information. The signal component of the received signal that has received reflected wave is several dozen to several hundred MHz, and even taking into account the Doppler frequency described above, will still be several dozen to several hundred MHz. In contrast, the fundamental frequency of the variation in the DC level caused by the leakage components is 250 kHz or less; thus, it is easy to set the cutoff frequency of the high pass filter 130 such that only the variation in the DC level be removed.

Figure 6:
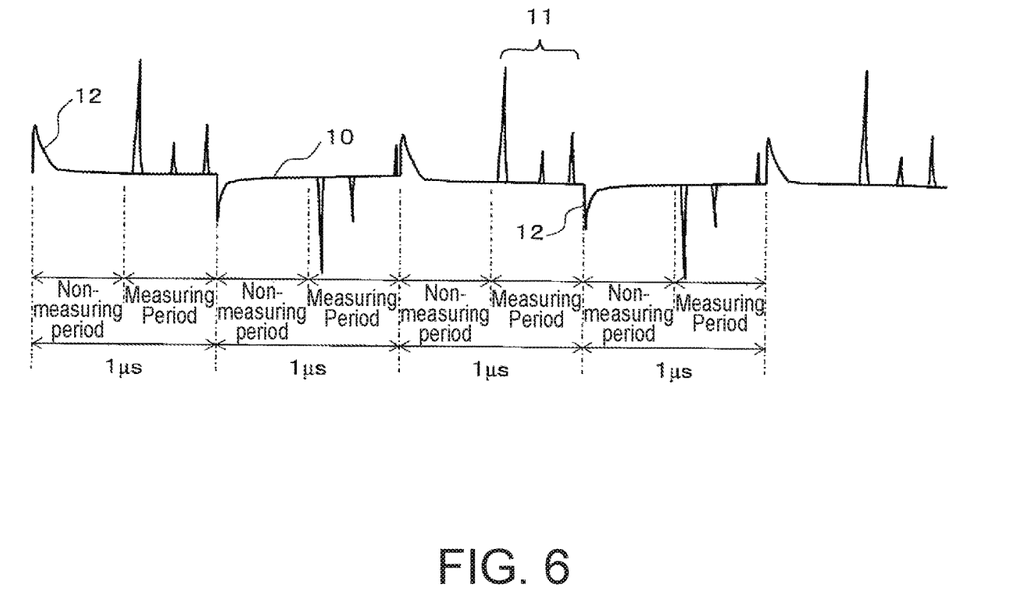
FIG. 6 is a time wave diagram showing one example of received signals after variation in a DC component has been removed by a high pass filter.

In order for the high pass filter 130 to remove signals at 250 kHz or below, which is the fundamental frequency of the variation in the DC level, the cutoff frequency should be set to a frequency that is 250 kHz or higher and less than the frequency set by formula (1) with N=1. Furthermore, in order to make it possible to remove not only the fundamental frequency of the variation in the DC level but also variation in higher-order frequencies, the cutoff frequency can be set appropriately such that N is 2 or greater in a range that is lower than the frequencies of the signal components received from the reflected waves. FIG. 6 shows one example of a time waveform of the received signals after the variation in the DC level has been removed with the high pass filter 130. As shown in FIG. 6, the time waveform when the high pass filter 130 is used has almost a uniform DC level compared to the time waveform when the high pass filter 130 is not used, as shown in FIG. 2. N is in a tradeoff relationship with the relaxation time of the differential waveform caused by the signal selection switching, as will be described next, and it is necessary to adjust the optimum value for N.

Because the high pass filter 130 is a differential circuit, when the signal selection switch 123 switches between the received signals, a differential waveform is superimposed on the received signals. The time waveform shown in FIG. 6 is one example when differential waveforms are superimposed on received signals. In FIG. 6, when the signal selection switch 123 is switching, differential waveforms such as those indicated by reference character 12 are superimposed on the received signals. This type of differential waveform is an unwanted signal that will influence the detection of object information, and thus the timing of the signal switching by the signal selection switch 123 should be adjusted in order to avoid this. As a countermeasure, FIGS. 6 and 7 will be used below to describe one example in which the signal switching by the signal selection switch 123 is adjusted so as to occur in a non-measuring period in which objects are not detected.

If the maximum detection range of the pulse radar 100 is 75 m for example, then it takes a time of approximately 500 ns from emission of the pulse signal at the transmitting antenna 113 until receiving the reflected wave at the receiving antennas 121a, 121b, 121c, and 121d. Accordingly, when the pulse repetition period is 1 µs, detection of an object is performed in the first 500 ns of the 1 µs pulse repetition period, and the 500 ns in the second half is the non-measuring period.

Thus, the switching between the received signals by the signal selection switch 123 is set so as to be performed during the 500 ns period in the second half of the 1 µs pulse repetition period when object detection is not being performed. FIG. 6 shows one example of when the switching of the signal selection switch 123 is set to be performed during the 500 ns period in the second half. As shown in FIG. 6, the received signals of the reflected waves, which are necessary for the detection of object information, appear in the measuring period, whereas the unwanted differential waveforms caused by the switching of the signal selection switch 123 appear in the non-measuring period. The frequency analyzer 126 processes only the received signals in the measuring period, thus eliminating the risk that the unwanted differential waveforms will influence the detection of object information.

Figure 7:
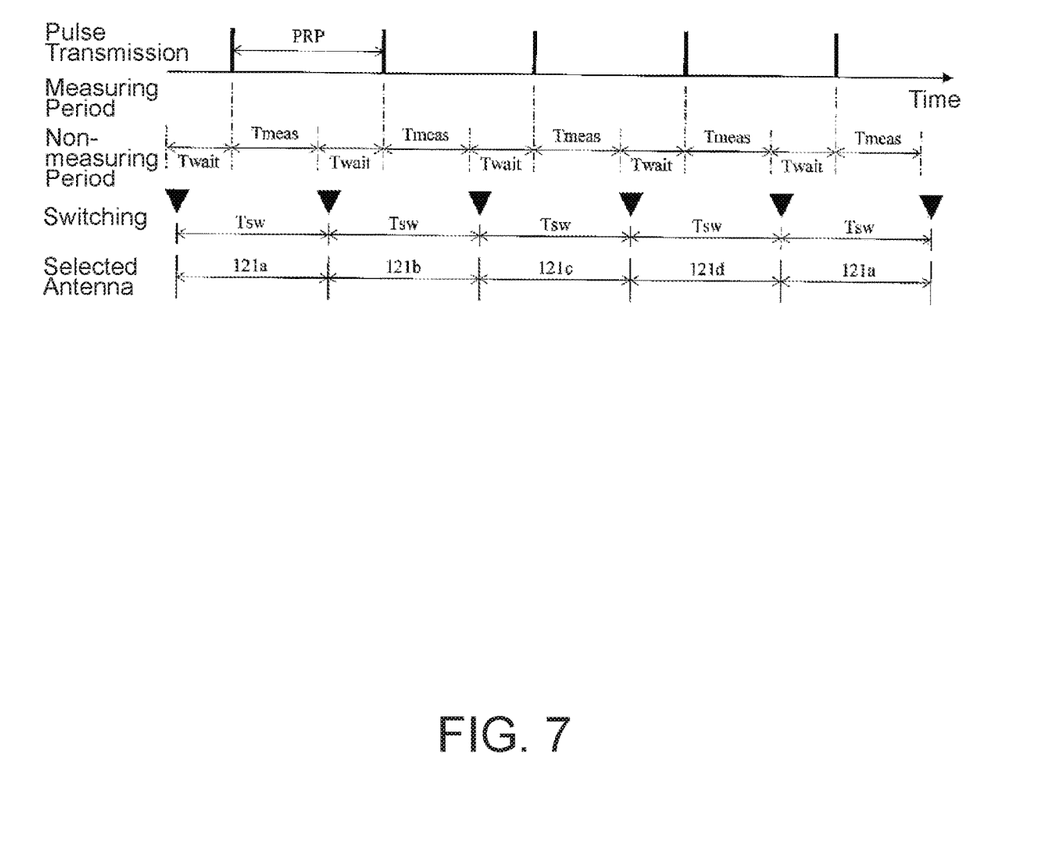
FIG. 7 is a view of the relationship between signal switching timing by the signal selection switch and a measuring period & non-measuring period.

The relationship between the signal switching timing of the signal selection switch 123 and the measuring period & non-measuring period in FIG. 6 will be explained in more detail using FIG. 7. In FIG. 7, PRP (=1/PRF) is the pulse repetition period, Tmeas is the measuring period, Twait is the non-measuring period, Tsw is the signal switching period, and Tsw=Tmeas+Twait. The signal switching timing by the signal selection switch 123 is represented in the drawing by "▼," which indicates that the signal switching timing is within the non-measuring period Twait. It shows that the receiving antennas are sequentially switched in the order of 121a→121b→121c→121d for each signal switching timing, and afterwards the order returns to 121a. The switching order of the receiving antennas is not limited to the above and can be set to any order.

Figure 8:
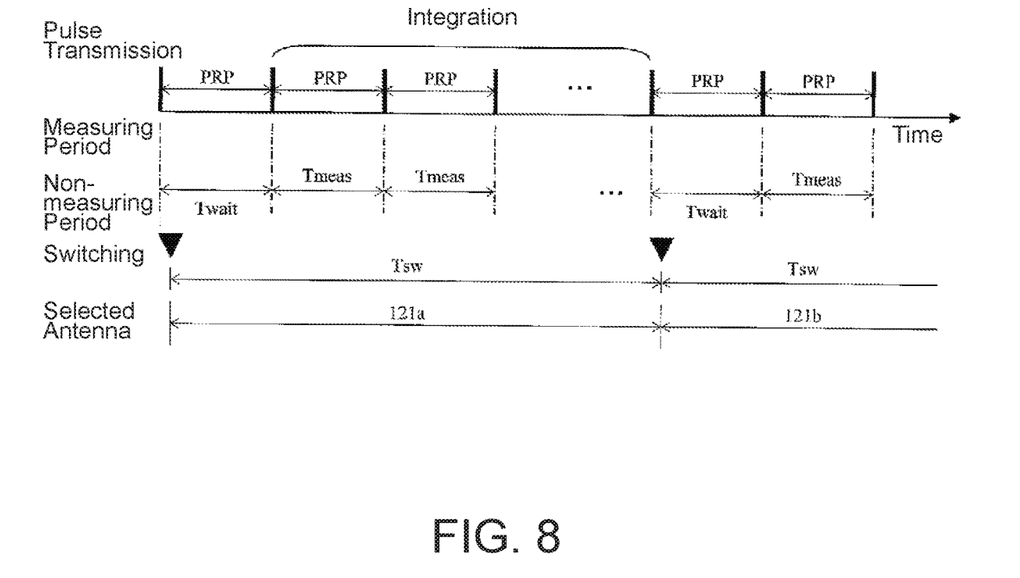
FIG. 8 is a view of one example in which the signal selection switch does not perform signal switching until measurement data from the necessary number of transmission signals for integral processing has been received.

In the example shown in FIGS. 6 and 7, the signals from the receiving antennas 121a, 121b, 121c, and 121d are switched every one measurement when the transmission signal is emitted, but are not limited to this. For example, if the signals from the respective antennas are to be integrated in order to improve sensitivity of the received signals, then as illustratively shown in FIG. 8, it is possible to set the signal selection switch 123 to not perform signal switching until measurement data from the necessary number of transmission signals for integration has been received. In such a case, the next pulse repetition period PRP after integration of the signals from the respective antennas has ended is set to a non-measuring period, and signal switching by the signal selection switch 123 is performed during this non-measuring period. Then, integration for the switched antenna signals begins from the further following pulse repetition period. This makes it possible to avoid the influence of unwanted signals caused by the switching of the signal selection switch 123. In addition, it is possible to shorten the pulse repetition period PRP by not providing both the measuring period Tmeas and the non-measuring period Twait in the respective pulse repetition periods PRP, and this would make it possible to expand the dynamic range of relative speeds calculated by a FFT.

As described above, the pulse radar device of the present embodiment makes it possible, with a simple circuit configuration and signal processing, to reduce the influence of carrier leakage in local signals on received signals and makes it possible to perform high-precision angle measurement via a multi-beam scheme.

The disclosures in the present embodiment are one example of a pulse radar device of the present invention, and the pulse radar device of the present invention is not limited to these disclosures. Various modifications can be made to the precise configuration and detailed operations of the pulse radar device of the present embodiment without departing from the spirit of the present invention.

What is claimed is:

1. A pulse radar device, comprising:
    a continuous wave generation circuit generating a continuous wave of a prescribed high frequency;
    a transmission circuit receiving the continuous wave generated by the continuous wave generation circuit and modulating the continuous wave into a pulse signal;
    a transmitting antenna repeatedly emitting the pulse signal from the transmission circuit into space at a prescribed emission period;
    two or more receiving antennas receiving reflected signals from the pulse signal emitted from the transmitting antenna reflecting off of an object to be measured;
    two or more amplifiers respectively amplifying the received reflected signals that have been received by the two or more receiving antennas so as to output respective amplified signals;
    a signal selection switch receiving the respective amplified signals and switching between said respective amplified signals at a prescribed switching period so as to sequentially select and output the amplified signals originating from one of the receiving antennas at the prescribed switching period;
    a mixer receiving said selected amplified signals sequentially outputted from the signal selection switch, the mixer down-converting said selected amplified signals by using the continuous wave input from the continuous wave generation circuit so as to output a baseband signal;
    a frequency analyzer analyzing the baseband signal from the mixer and outputting information about the object detected from the baseband signal; and
    a high pass filter provided after the signal selection switch and before the frequency analyzer, the high pass filter causing DC and other low frequency components that are lower than a prescribed frequency in the baseband signal to be removed before reaching the frequency analyzer,
    wherein the prescribed emission period of the pulse signal repeatedly outputted from the transmitting antenna is divided into Tmeas and Twait, where Tmeas is a measuring period at least as long as a time it would take for the pulse signal to reach and be reflected off of the object if the object were located at a prescribed maximum measurable distance, and Twait is a remaining period of the emission period, and
    wherein the signal selection switch switches between said respective amplified signals at a point in time within Twait.

2. The pulse radar device according to claim 1, wherein the high pass filter is provided between the mixer and the frequency analyzer.

3. The pulse radar device according to claim 2, wherein a cutoff frequency of the high pass filter is higher than a frequency set by the prescribed switching period at which the signal selection switch sequentially selects and outputs the one of the respective amplified signals.

4. The pulse radar device according to claim 1, wherein a cutoff frequency of the high pass filter is higher than a frequency set by the prescribed switching period at which the signal selection switch sequentially selects and outputs the one of the respective amplified signals.

5. The pulse radar device according to claim 4, further comprising:
    a distributor distributing said one of the respective amplified signals sequentially outputted from the signal selection switch into two signals,
    wherein the mixer is an IQ mixer receiving the two signals that have been distributed by the distributor and down-converting the two received signals into an I component baseband signal and a Q component baseband signal, respectively.

6. The pulse radar device according to claim 4, wherein the frequency analyzer detects at least a direction in which the object is located relative to a position of the pulse radar device.

7. The pulse radar device according to claim 4, wherein the high pass filter has a capacitor.

8. The pulse radar device according to claim 1, further comprising:
a distributor distributing said one of the respective amplified signals sequentially outputted from the signal selection switch into two signals,
wherein the mixer is an IQ mixer receiving the two signals that have been distributed by the distributor and down-converting the two received signals into an I component baseband signal and a Q component baseband signal, respectively.

9. The pulse radar device according to claim 8, wherein the frequency analyzer detects at least a direction in which the object is located relative to a position of the pulse radar device.

10. The pulse radar device according to claim 1, wherein the frequency analyzer detects at least a direction in which the object is located relative to a position of the pulse radar device.

11. The pulse radar device according to claim 1, wherein the high pass filter has a capacitor.

12. A pulse radar device, comprising:
a continuous wave generation circuit generating a continuous wave of a prescribed high frequency;
a transmission circuit receiving the continuous wave generated by the continuous wave generation circuit and modulating the continuous wave into a pulse signal;
a transmitting antenna repeatedly emitting the pulse signal from the transmission circuit into space at a prescribed emission period;
two or more receiving antennas receiving reflected signals from the pulse signal emitted from the transmitting antenna reflecting off of an object to be measured;
two or more amplifiers respectively amplifying the received reflected signals that have been received by the two or more receiving antennas so as to output respective amplified signals;
a signal selection switch receiving the respective amplified signals and switching between said respective amplified signals at a prescribed switching period so as to sequentially select and output the amplified signals originating from one of the receiving antennas at the prescribed switching period;
a mixer receiving said selected amplified signals sequentially outputted from the signal selection switch, the mixer down-converting said selected amplified signals by using the continuous wave input from the continuous wave generation circuit so as to output a baseband signal;
a frequency analyzer analyzing the baseband signal from the mixer and outputting information about the object detected from the baseband signal; and
a high pass filter provided after the signal selection switch and before the frequency analyzer, the high pass filter causing DC and other low frequency components that are lower than a prescribed frequency in the baseband signal to be removed before reaching the frequency analyzer,
wherein for every one or more of the prescribed emission period of the pulse signal that is repeatedly outputted from the transmitting antenna, a pair of a measuring period and a non-measuring period is provided for the frequency analyzer,
wherein the measuring period is at least as long as a time it would take for the pulse signal to reach and be reflected off of the object if the object were located at a prescribed maximum measurable distance,
wherein the frequency analyzer analyzes the baseband signal generated from the reflected signals that were received during the measuring period so as to detect the information about the object, but does not analyze or receive the baseband signal generated from the reflected signals that were received during the non-measuring period, and
wherein the signal selection switch switches between said respective amplified signals at a point in time within the non-measuring period.

13. The pulse radar device according to claim 12, wherein the high pass filter is provided between the mixer and the frequency analyzer.

14. The pulse radar device according to claim 13, wherein a cutoff frequency of the high pass filter is higher than a frequency set by the prescribed switching period at which the signal selection switch sequentially selects and outputs the one of the respective amplified signals.

15. The pulse radar device according to claim 12, wherein a cutoff frequency of the high pass filter is higher than a frequency set by the prescribed switching period at which the signal selection switch sequentially selects and outputs the one of the respective amplified signals.

16. The pulse radar device according to claim 15, further comprising:
a distributor distributing said one of the respective amplified signals sequentially outputted from the signal selection switch into two signals,
wherein the mixer is an IQ mixer receiving the two signals that have been distributed by the distributor and down-converting the two received signals into an I component baseband signal and a Q component baseband signal, respectively.

17. The pulse radar device according to claim 15, wherein the frequency analyzer detects at least a direction in which the object is located relative to a position of the pulse radar device.

18. The pulse radar device according to claim 12, further comprising:
a distributor distributing said one of the respective amplified signals sequentially outputted from the signal selection switch into two signals,
wherein the mixer is an IQ mixer receiving the two signals that have been distributed by the distributor and down-converting the two received signals into an I component baseband signal and a Q component baseband signal, respectively.

19. The pulse radar device according to claim 18, wherein the frequency analyzer detects at least a direction in which the object is located relative to a position of the pulse radar device.

20. The pulse radar device according to claim 12, wherein the frequency analyzer detects at least a direction in which the object is located relative to a position of the pulse radar device.

* * * * *